United States Patent
Shibata

[19]

[11] Patent Number: 6,042,092
[45] Date of Patent: Mar. 28, 2000

[54] BELLOWS CYLINDER

[75] Inventor: Hiroshi Shibata, Aichi, Japan

[73] Assignee: Inoac Corporation, Aichi, Japan

[21] Appl. No.: 08/986,308

[22] Filed: Dec. 5, 1997

[30] Foreign Application Priority Data

Dec. 6, 1996 [JP] Japan ................................. 8-342747
Dec. 13, 1996 [JP] Japan ................................. 8-353001

[51] Int. Cl.$^7$ ................................................ F16J 15/50
[52] U.S. Cl. ........................ 267/122; 267/64.27; 267/35
[58] Field of Search ................................. 267/122, 64.27, 267/64.23, 64.19, 35, 34, 33, 220, 221; 188/322.12; 74/18.2, 18, 18.1; 277/636; 464/173, 175; 285/226, 227, 299, 300; 92/34, 37, 46; 138/121; 403/134, 175

[56] References Cited

U.S. PATENT DOCUMENTS

| | | |
|---|---|---|
| 2,942,838 | 6/1960 | Peters . |
| 3,101,131 | 8/1963 | De Carbon et al. . |
| 3,908,704 | 9/1975 | Clement et al. . |
| 4,114,460 | 9/1978 | Oto .................................................. 74/18.2 |
| 4,235,427 | 11/1980 | Bialobrzeski . |
| 4,278,262 | 7/1981 | Mizutani et al. ........................ 74/18.2 |
| 4,629,641 | 12/1986 | Paullin ........................................ 92/34 |
| 4,730,834 | 3/1988 | Ukai et al. . |
| 4,786,272 | 11/1988 | Baker . |
| 4,828,237 | 5/1989 | Neff ................................... 188/322.12 |
| 4,844,486 | 7/1989 | Schiemann . |
| 4,878,389 | 11/1989 | Boge . |
| 4,923,432 | 5/1990 | Porter . |
| 5,192,057 | 3/1993 | Wydra et al. ........................... 267/122 |
| 5,261,319 | 11/1993 | Laville et al. .............................. 92/34 |
| 5,308,091 | 5/1994 | Mihalcin . |
| 5,645,286 | 7/1997 | Katoh . |
| 5,672,113 | 9/1997 | Tomogami et al. . |

FOREIGN PATENT DOCUMENTS

| | | |
|---|---|---|
| 59-152285 | 10/1984 | Japan . |
| 61-53608 | 4/1986 | Japan . |
| 61-24577 | 6/1986 | Japan . |
| 2535936 | 2/1997 | Japan . |
| 2031530 | 4/1980 | United Kingdom . |

*Primary Examiner*—Douglas C. Butler
*Attorney, Agent, or Firm*—Sughrue, Mion, Zinn Macpeak & Seas, PLLC

[57] ABSTRACT

A bellows cylinder (10) provided with a bellows part (13) at least at a part is formed so that a first surface 16 of a cylinder wall of the above bellows part is tilted to the radial direction of the bellows part and is directed to one end of the bellows part with a ridge (14) as a boundary. A second surface 18 is parallelized to the radial direction of the bellows part and is directed to the other end of the bellows part or is tilted on the side of the first surface. The second surface is pressed inside the first surface when the bellows part is compressed.

4 Claims, 11 Drawing Sheets

BELLOWS CYLINDER

BACKGROUND OF THE INVENTION

1. Field of the Invention

The present invention relates to a bellows cylinder used for a vehicular suspension and other general machinery and others.

2. Description of the Related Art

Figure 12:
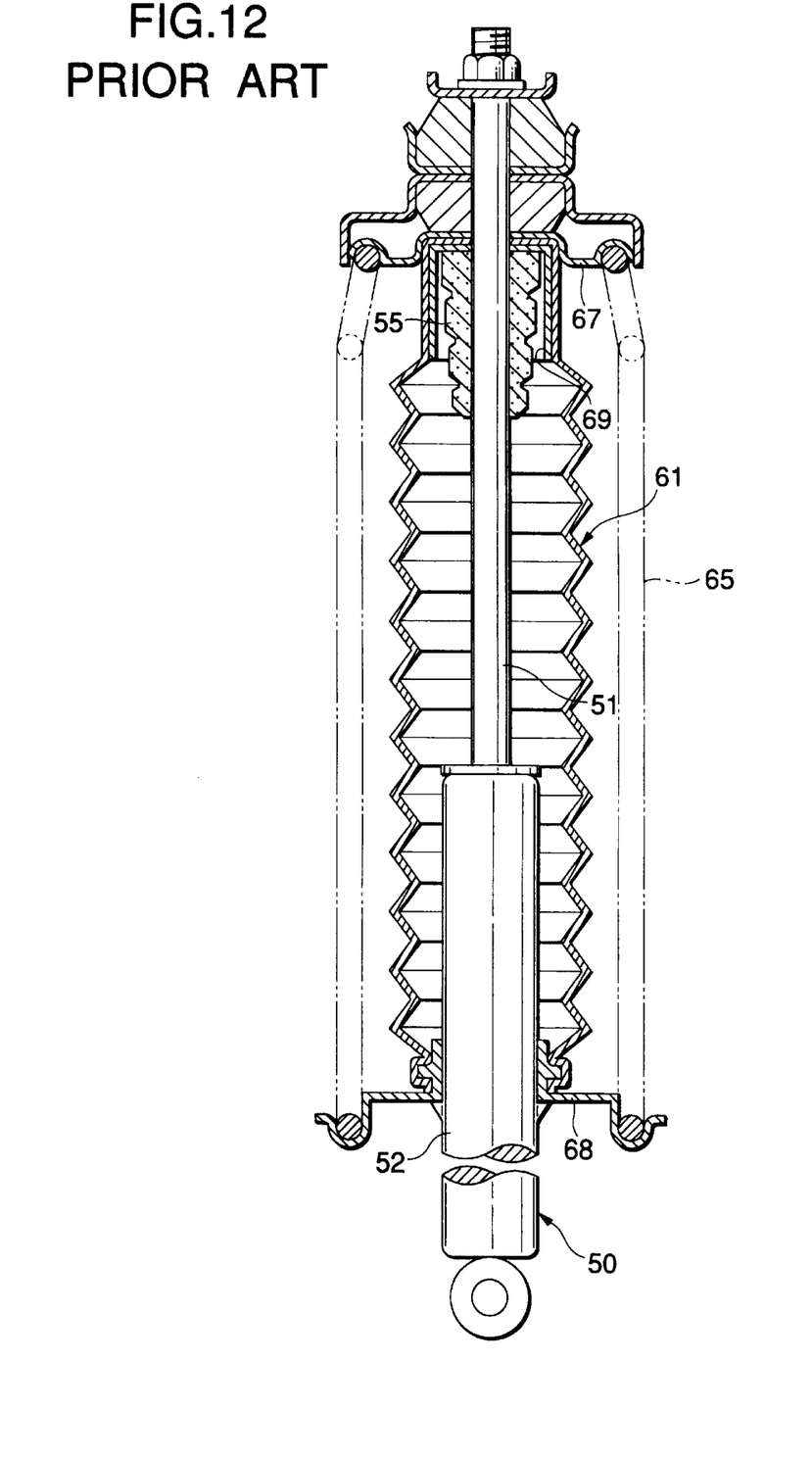
FIG. 12 is a sectional view showing the used state of a conventional type bellows cylinder.

Heretofore, a bellows cylinder is greatly used for the extension part of machinery and others. For example, a bump cushion (also called a bump stopper and a cushion rubber) 55 is attached to the upper part of a piston rod 51 of an oil cushion 50 as shown in FIG. 12 in a suspension provided to the front wheel or the rear wheel of a vehicle, a bellows cylinder 61 consisting of an elastic body such as rubber for covering the piston rod 51 and the bump cushion 55 is attached and a coil spring 65 may be also attached outside the bellows cylinder 61. A reference number 52 denotes a cylinder, 67 denotes an upper spring seat, 68 denotes a lower spring seat and 69 denotes a metallic cylindrical reinforcement. The above bellows cylinder 61 used for a vehicular suspension is normally called a dust cover, however, in this specification, it is called a bellows cylinder.

In the suspension, the piston rod 51 and the coil spring 65 of a shock absorber are stretched or contracted against vibration and shock from a road surface to absorb shock, when they are compressed at their maximum, the upper end of the cylinder 52 is in contact with the bump cushion 55 and the compression and transformation of the bump cushion 55 prevent the upper end of the cylinder from coming in contact with the bottom. The above bellows cylinder 61 is stretched or contracted together with the piston rod 51 and the coil spring 65 to prevent mud from adhering to the piston rod 51 and the bump cushion 55 and a stone on a road surface from hitting on them.

Figure 13:
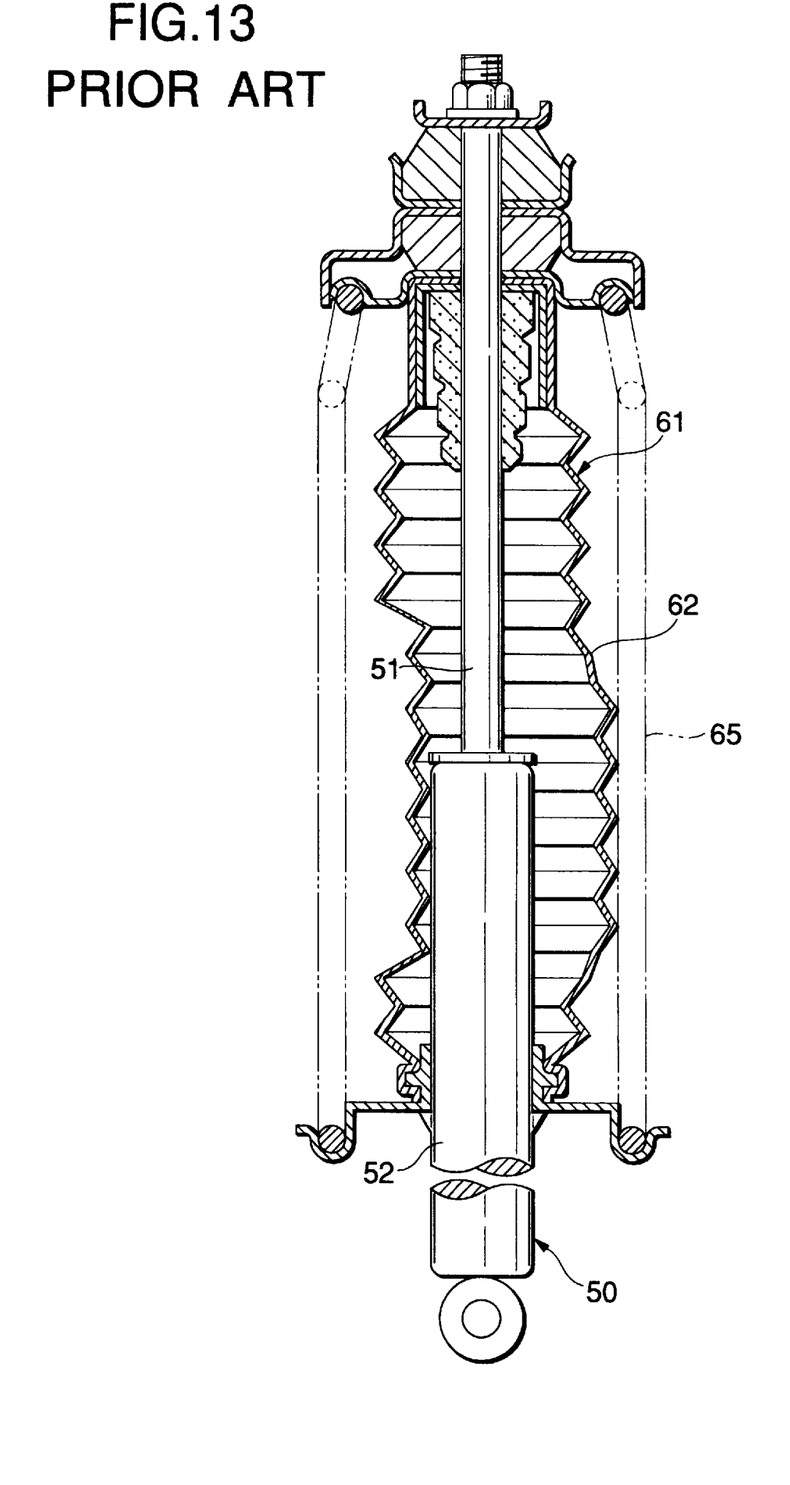
FIG. 13 is a sectional view showing the bend of the barrel of the conventional type bellows cylinder.

The length of the above piston rod 51 and others is different depending upon the type of a vehicle, whether a suspension is for a front wheel or a rear wheel and others and according to the length, the length of the bellows cylinder 61 is also different. Therefore, if the bellows cylinder 61 is long as in this example, a part of bellows 62 is bent (hereinafter called the bend of the barrel) in the radial direction on the way of compression as shown in FIG. 13 and may come in contact with the coil spring 65 and the cylinder 52. The part of bellows 62 may be damaged by contact with the coil spring 65 and others.

It can be considered that to prevent the barrel of the bellows cylinder 61 from being bent, the diameter of the bellows cylinder 61 is extended, however, as the coil spring 65 surrounds the outside of the bellows cylinder 61, there is a limit to the diameter of the bellows cylinder 61. Thus, the diameter cannot be extended enough to prevent the barrel from being bent when the bellows cylinder is compressed. In addition, as the diameter of the coil spring 65 is determined in view of a function and space, the diameter of the coil spring 65 cannot be also changed to extend the diameter of the bellows cylinder 61.

SUMMARY OF THE INVENTION

The present invention has been made to solve such problems and an object of the present invention is to reduce the bend of the barrel when the bellows cylinder used for a vehicular suspension and other machinery is compressed.

To achieve the above object, according to the present invention, there is provided a bellows cylinder characterized in that the bellows cylinder provided with a bellows part at least at a part is formed so that the cylinder wall of the bellows part is tilted to the radial direction of the bellows part on a first surface directed to one end of the bellows part with the ridge as a boundary, is parallelized to the radial direction of the bellows part or is tilted on the side of the first surface on a second surface directed to the other end of the bellows part and the above second surface is pressed inside the first surface when the bellows part is compressed.

Also, according to the present invention, there is provided a bellows cylinder in which a bellows part is divided into plural areas along the longitudinal direction in a bellows cylinder provided with the bellows part at least at a part and difference in a radius between a ridge and a trough and pitch are differentiated every area.

The above and other objects and features of the present invention will be more apparent from the following description taken in conjunction with the accompanying drawings.

BRIEF DESCRIPTION OF THE PREFERRED EMBODIMENTS

Now, a description will be given in more detail of preferred embodiments of the invention with reference to the accompanying drawings.

Figure 1:
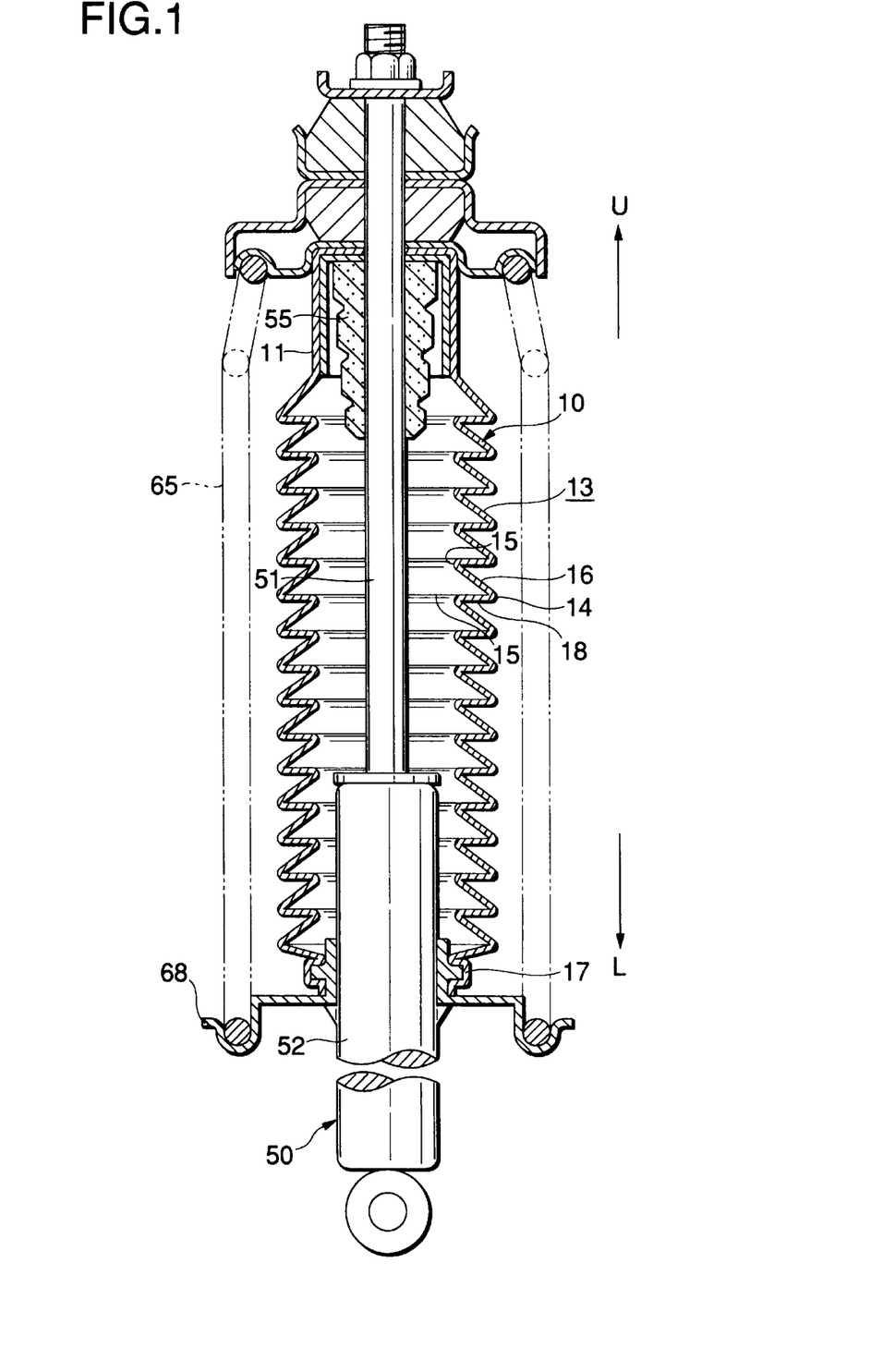
FIG. 1 is a sectional view showing the used state of a bellows cylinder according to a first embodiment of the invention.
Figure 2:
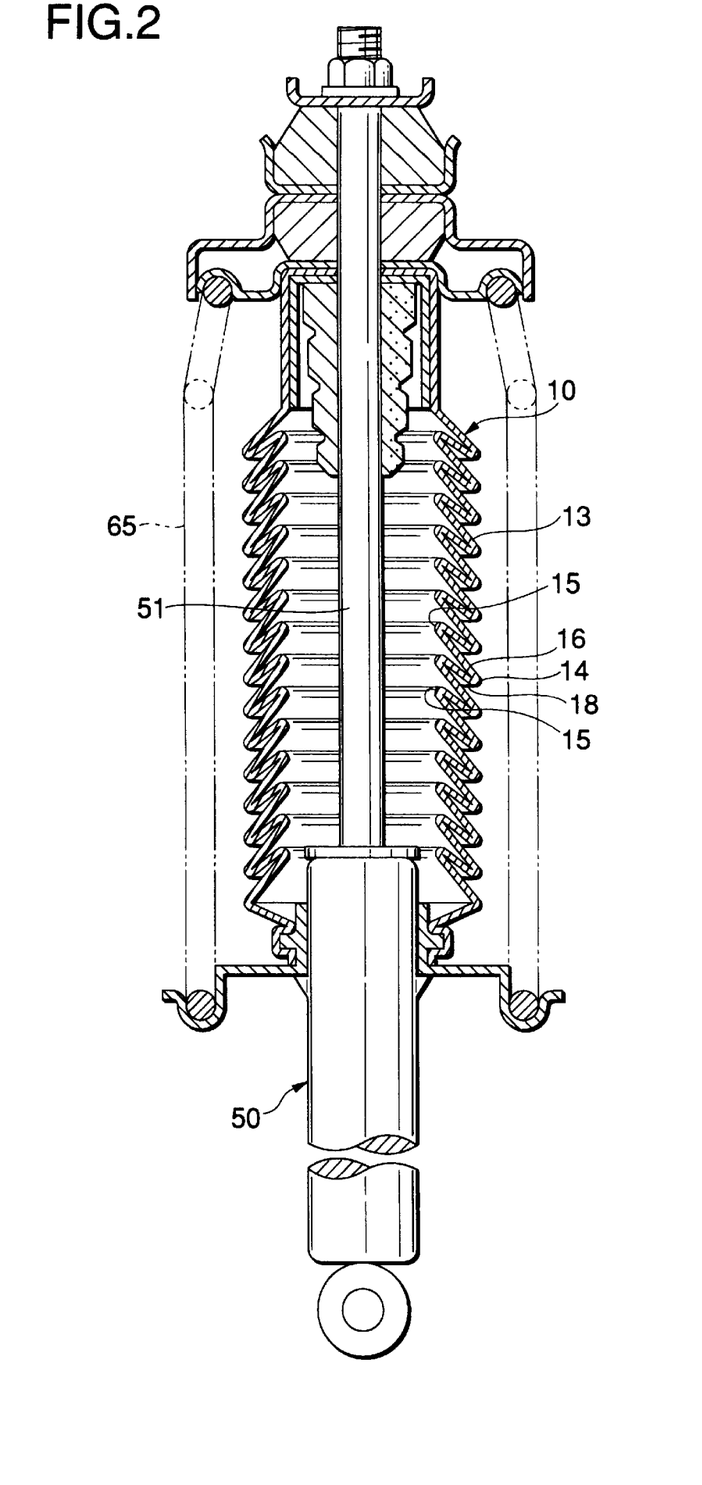
FIG. 2 is a sectional view showing the compressed state of the above cylinder.
Figure 3:
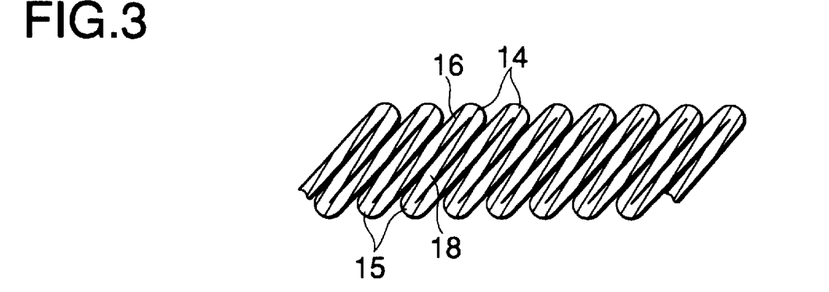
FIG. 3 is a sectional view showing the enlarged main part.
Figure 4:
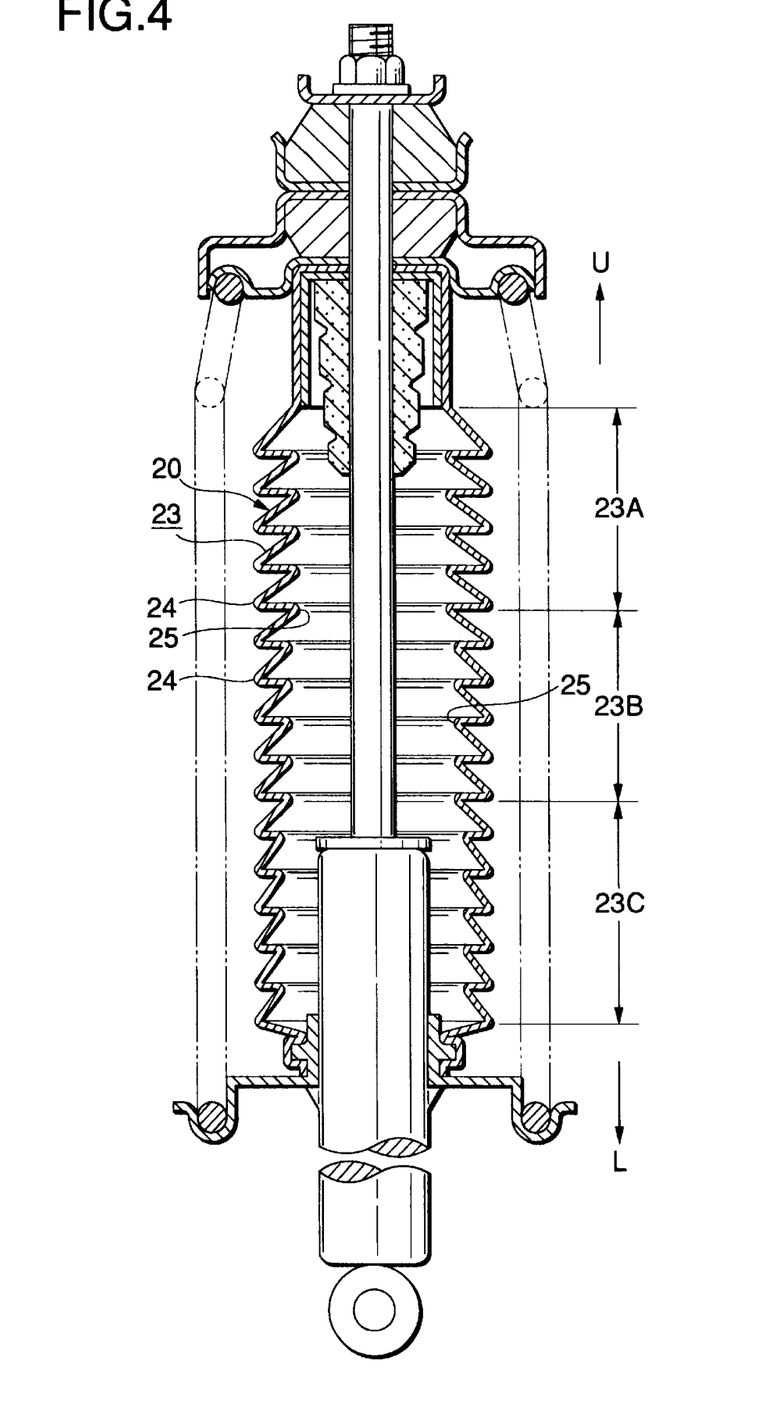
FIG. 4 is a sectional view showing the used state of a bellows cylinder according to a second embodiment of the invention.
Figure 5A:
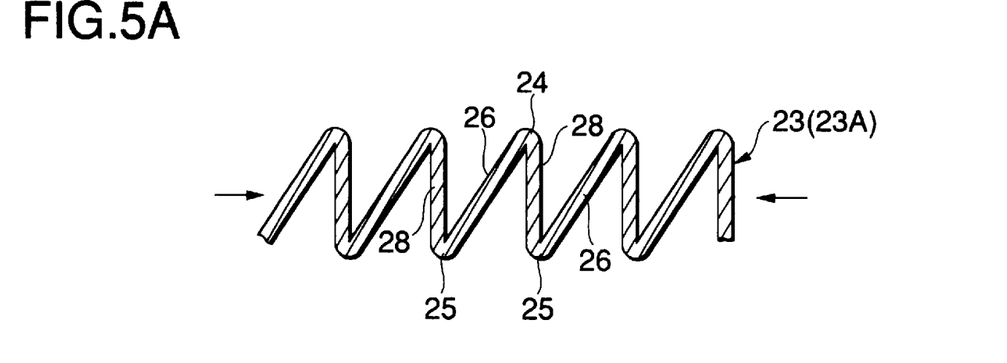
FIGS. 5A, 5B, 5C are sectional views showing an enlarged cylinder wall in each area.
Figure 5B:
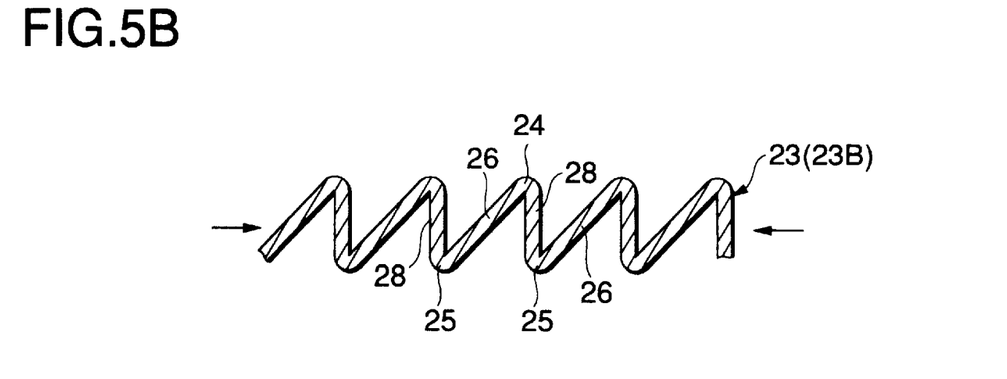
Figure 5C:
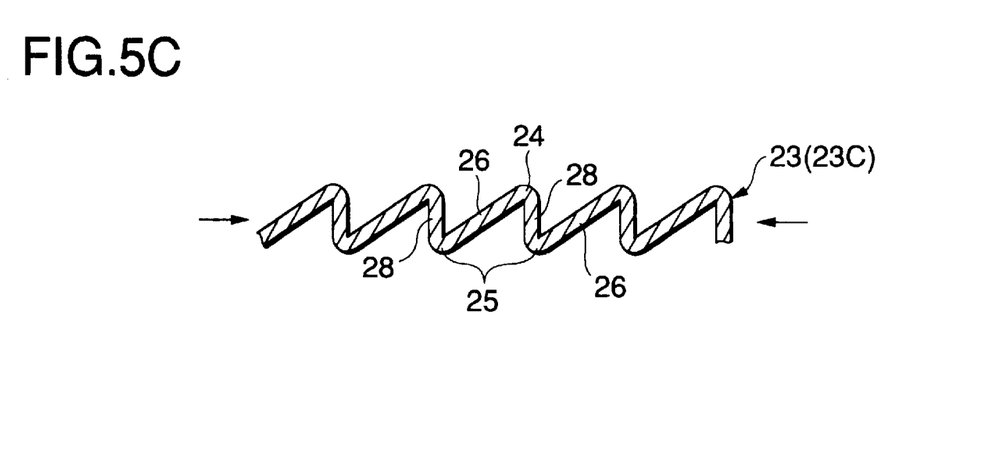
Figure 6A:
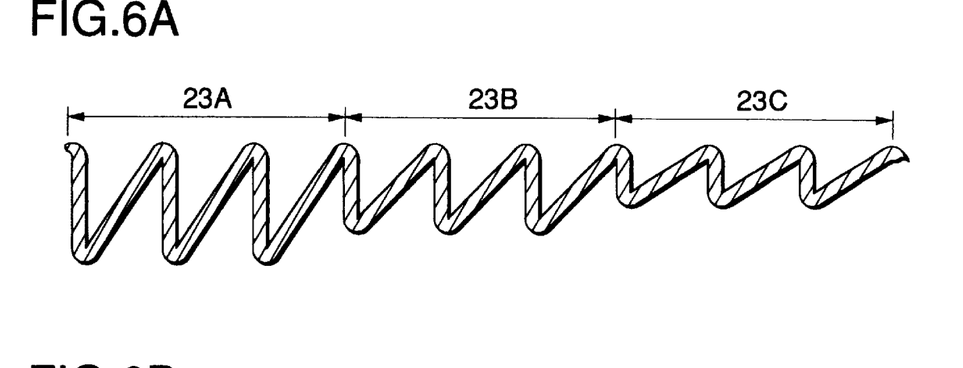
FIGS. 6A, 6B, 6C, 6D are sectional views stepwise showing the compressed state of the cylinder wall.
Figure 6B:
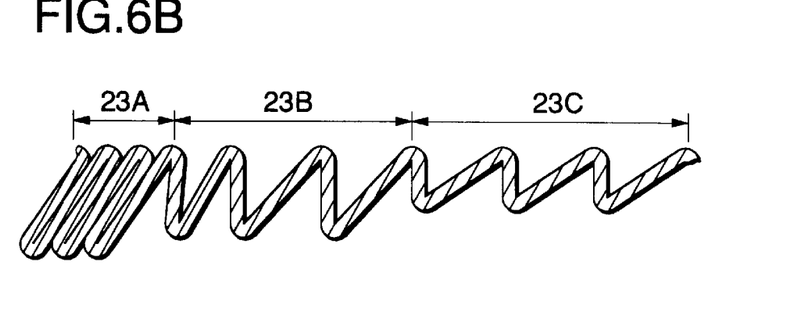
Figure 6C:
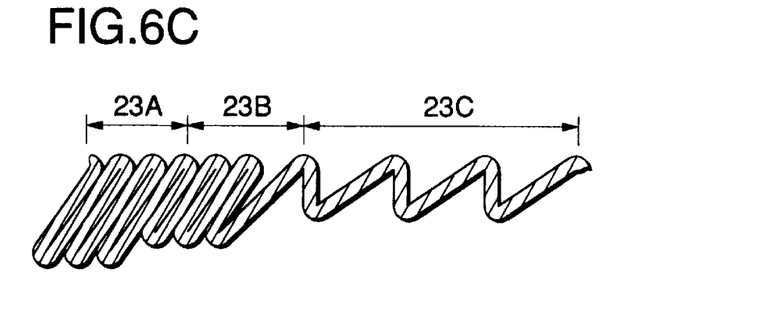
Figure 6D:
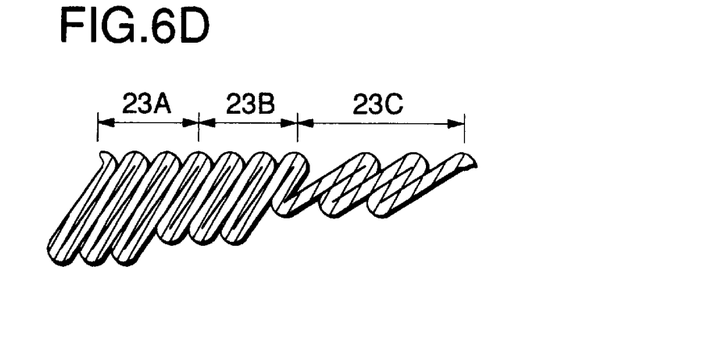
Figure 7:
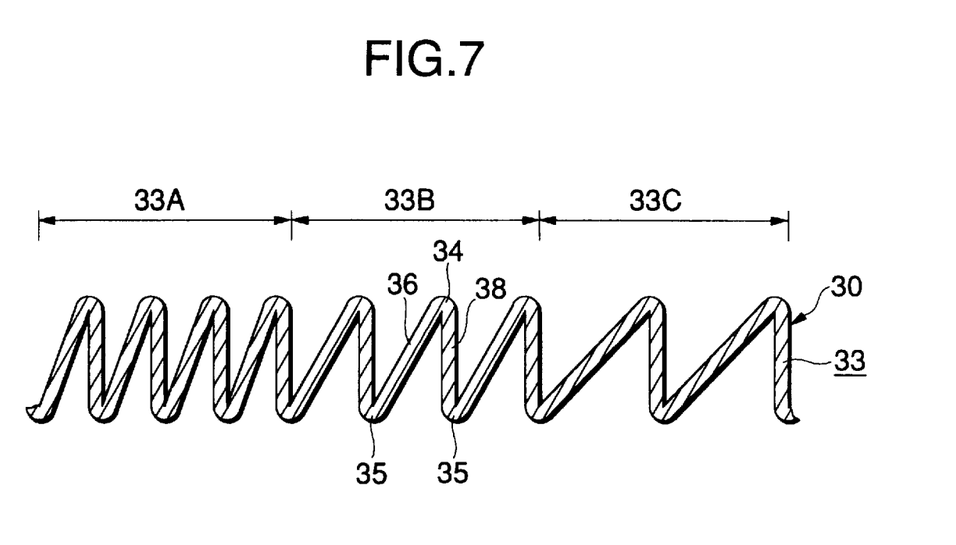
FIG. 7 is a sectional view schematically showing the cylinder wall of a bellows cylinder according to a third embodiment of the invention.
Figure 8:
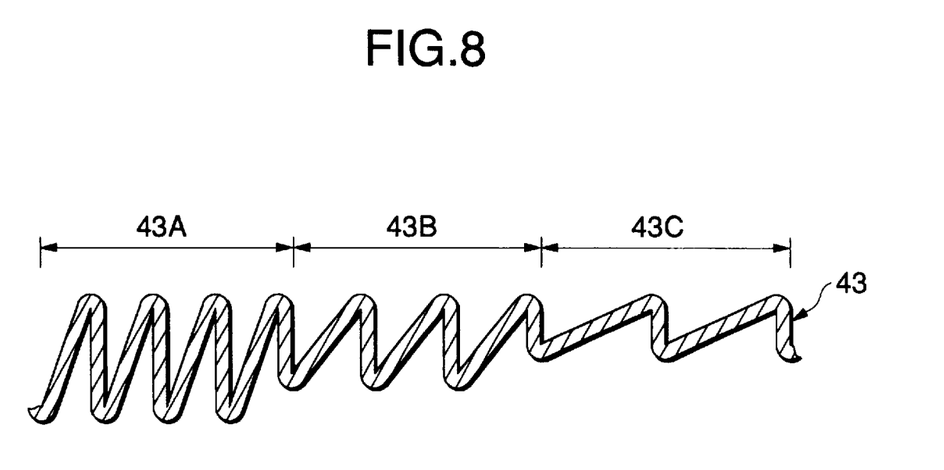
FIG. 8 is a sectional view schematically showing the cylinder wall of a bellows cylinder according to a fourth embodiment of the invention.

FIG. 1 is a sectional view showing a state in which a bellows cylinder according to a first embodiment of the invention is used, FIG. 2 is a sectional view showing a state in which the cylinder is compressed, FIG. 3 is a sectional view showing the enlarged main part, FIG. 4 is a sectional view showing a state in which a bellows cylinder according to a second embodiment of the invention is used, FIGS. 5A to 5C are sectional views showing an enlarged cylinder wall in each area, FIGS. 6A to 6D are sectional views stepwise showing compressed states, FIG. 7 is a sectional view schematically showing the cylinder wall of a bellows cylinder according to a first embodiment of the invention and FIG. 8 is a sectional view schematically showing the cylinder wall of a bellows cylinder according to a fourth embodiment of the invention.

FIG. 1 shows a bellows cylinder according to a first embodiment of the invention. However, the same member as that described in the item of prior art is shown by the same reference number.

DETAILED DESCRIPTION OF THE INVENTION

A bellows cylinder 10 is attached with it covering a piston rod 51 of a shock absorber 50 in a vehicular suspension and consists of rubber, polyolefine thermoplastic elastomer (TPO), polyethylene, polyester elastomer or others. The bellows cylinder 10 in this embodiment is a cylinder with suitable thickness the upper part of which is a housing cylinder 11 of a bump cushion 55 and the lower part of which is a bellows part 13. A groove 17 for fitting to a lower spring seat 68 is formed on the inner surface at the lowest end. The material and thickness of the cylinder 10 may be suitably determined according to required strength, rigidity resistible to compression, used environment and others.

The above bellows part 13 is provided to stretch or contract the bellows cylinder 10 according to the stretch or contraction of the piston rod 51 and a coil spring 65 and are provided with a cylinder wall on which plural bellows in each of which a first surface 16 and a second surface 18 are curved via a ridge 14 as shown in FIG. 1, and are continuously arranged via a trough 15. The bellows part 13 is formed according to fixed pitch and the inside and outside diameters. The cylinder wall of the bellows part 13 is formed so that the first surface 16 directed to one end of the bellows part 13 with the ridge 14 as a boundary is tilted to the radial direction of the bellows part 13 and the second surface 18 directed to the other end of the bellows part 13 is parallelized to the radial direction of the bellows part 13. In this embodiment, the first surface 16 of the bellows part 13 is directed to the side U of the upper end of the cylinder 10 and the second surface 18 is directed to the side L of the lower end.

In the bellows part 13 formed as described above, when the cylinder 10 is compressed, the second surface 18 of the bellows part 13 is folded at the ridge 14 and the trough 15 and pressed inside the first surface 16 as understood from enlarged drawings shown in FIGS. 2 and 3. Hereby, as the first surface 16 and the second surface 18 are folded and the cylinder wall of the whole bellows part 13 is thickened seemingly, deflection in the radial direction is reduced and the bend of the barrel of the cylinder can be inhibited. Easiness in which the bellows part 13 is compressed is determined by the degree of the tilt of the first surface 16 to the radial direction of the bellows part 13 and as the first surface is close to a horizontal line if the tilt is small, the bellows part is readily compressed. The degree of the tilt of the first surface 16 is suitably determined in consideration of the material and form of the bellows cylinder 10 or easiness required for the cylinder 10 in which the cylinder is compressed. FIG. 3 shows the bellows part 13 of the cylinder 10 shown in FIG. 2 the vertical direction of which is turned so that the vertical direction is horizontal. The cylinder wall of the cylinder shown in the following embodiments is also shown so that the vertical direction when the cylinder is used is horizontal and a part shown as an area on the left side or an area on the right side can be also read as an area in an upper part or an area in a lower part.

FIG. 4 shows a bellows cylinder according to a second embodiment of the invention.

The bellows part 23 of the above bellows cylinder 20 is divided into three areas (23A, 23B, 23C) at a predetermined interval along the longitudinal direction and difference in a radius between the ridge 24 and the trough 25 of the cylinder wall is different in every area. In the present invention, the difference in a radius means the depth of one bellow between the ridge 24 and the trough 25. Difference in a radius in this embodiment is increased or decreased from one end of the bellows part 23 to the other end. It is desirable that the difference in a radius in the bellows part 23 is provided without changing the diameter of the cylinder 20 because the bellows part is prevented from coming in contact with another instrument such as a coil spring. Therefore, it is desirable that the difference in a radius is made by decreasing or increasing the diameter on the side of the trough 25 with the position of the ridge 24, that is, the outside diameter kept as it is as shown in FIG. 6A. The difference in a radius between the ridge 24 and the trough 25 of the bellows part 23 is kept fixed in one area and is different in every other area. In this embodiment, the difference in a radius in the three areas 23A, 23B and 23C is respectively set to 17.4 mm, 15.4 mm and 13.4 mm and is increased from the side U of the upper end to the side L of the lower end.

The above difference in a radius has an effect upon difficulty in deforming when the bellows part 23 is compressed, the bellows part is readily compressed in an area in which the difference in a radius is large and is difficult to compress in an area in which the difference in a radius is small. That is, as shown in FIG. 5A, in an area in which the difference in a radius is large in the bellows part with the same pitch, the width of the cylinder wall between the ridge 24 and the trough 25 is increased and the tilt of the cylinder wall is close to a horizontal line in the radial direction of the bellows part. Therefore, when force is applied to the longitudinal direction of the cylinder 10, the cylinder wall is folded on a boundary at the ridge 24 and the trough 25 and a second surface 28 is readily pressed inside a first surface 26.

In the meantime, as the form of the cylinder is close to a cylinder in an area in which the difference in a radius is small as shown in FIGS. 5B and 5C, the stress of the cylinder wall against a compressed direction is increased and it is difficult to compress the cylinder wall. As understood from FIG. 4, as the difference in a radius is large in an area in an upper end part U and the difference in a radius is decreased in the direction of an area in a lower end part L in the bellows cylinder 20 in this embodiment, the bellows are most readily compressed in the highest area 23A, they are next readily compressed in the middle area 23B and they are most difficult to compress in the lowest area 23C.

In the bellows cylinder 20 constituted as described above, when the piston rod 51 and the coil spring 65 are compressed by the irregularities of a road surface and others, the highest area 23A where the bellows are most readily compressed in the bellows part 23 of the bellows cylinder 20 is first compressed as shown in FIG. 6B. Afterward, as shown in FIG. 6C, the middle area 23B where the bellows are next readily compressed is compressed and finally, as shown in FIG. 6D, the lowest area 23C where the bellows are most difficult to compress is compressed. As described above, as compression is started in one area of the bellows part 23 and the compression is shifted in order, the length of a compressed part is equivalent to the length of an area in which compression occurs and is short, compared with the length of the whole bellows part 23. This is equivalent to compressing a bellows cylinder provided with a short bellows part in order and as a whole, the bend of the barrel when the cylinder is compressed can be reduced even in the cylinder 20 provided with the long bellows part 23. Conversely, the difference in a radius in every area in the bellows part 23 may be also increased from the highest area 23A to the lowest area 23C in order.

As the difference in a radius is increased or decreased in order from the side U of one end of the bellows part 23 to the side L of the other end in the bellows cylinder 20 as described above, the middle part which is weak in rigidity is compressed earlier even if the bellows part 23 is long and hereby, deflection in the radial direction which readily occurs can be inhibited.

The number of the above areas, the length of each area, the thickness of the ridge and trough, pitch, in which direction of the upper end or the lower end of the bellows part the difference in a radius is increased in order and others are different depending upon the whole dimension, material and others of the bellows cylinder and may be suitably determined. However, as a cylinder the diameter of which is large is inserted on the side of the lower end of the bellows cylinder, there is an advantage that the inside diameter of the lower part of the bellows part is increased, and the bellows part and the above cylinder have difficulty coming in contact if an area in which the difference in a radius is small is positioned on the side of the lower end of the bellows part.

FIG. 7 shows an example of the cylinder wall of a bellows cylinder according to a third embodiment, the bellows part 33 of the cylinder 30 is divided into plural areas 33A, 33B and 33C and in each area, bellows each of which consists of a first surface 36 tilted as shown in FIG. 7 and a second surface 38 bent from the first surface 36 with a ridge 34 as a boundary are provided in different pitch every area. Pitch in the bellows part according to the present invention is shown by length from one ridge 34 to an adjacent ridge 34 via one trough 35. The pitch in the bellows part 33 is constituted so that the pitch is narrow in an area on the left side in FIG. 7 and is widened in order in an area in the right direction and in this embodiment, pitch in an area 33A on the left side is set to 10 mm, pitch in a middle area is set to 11 mm and pitch in an area on the right side is set to 12 mm. However, as described above, parts shown as the area on the left side and the area on the right side are equivalent to an area on the upper side and an area on the lower side when the cylinder is used.

According to the above structure, as understood from FIG. 7, if depth between the ridge 34 and the trough 35 of the bellows part 33 is fixed, the narrower the pitch is, the closer to a horizontal direction the tilt of the cylinder wall between the ridge 34 and the trough 35 is. Therefore, the cylinder wall is folded at the ridge 34 and the trough 35 and the second surface 38 is readily pressed inside the first surface 36. As described above, as in the example shown in FIG. 7, the bellows part is constituted so that pitch is wider in the area on the right side than in the area on the left side, the bellows part 33 is compressed from the left side in order when it is compressed.

Further, difficulty in compressing depending upon the above difference in a radius in the bellows part and difficulty in compressing the bellows part depending upon the change of pitch may be also combined. FIG. 8 shows an example of the cylinder wall according to a fourth embodiment of the invention. In a bellows part 43, the difference in a radius in divided areas 43A, 43B and 43C into three is decreased from the area on the left side 43A to the area on the right side 43C, while pitch is conversely widened from the area on the left side 43A to the area on the right side 43C. The number of these areas, the length of each area, the difference in a radius, the number of pitches and others may be suitably determined depending upon the form and material of the cylinder or used environment and others and combined.

Figure 9:
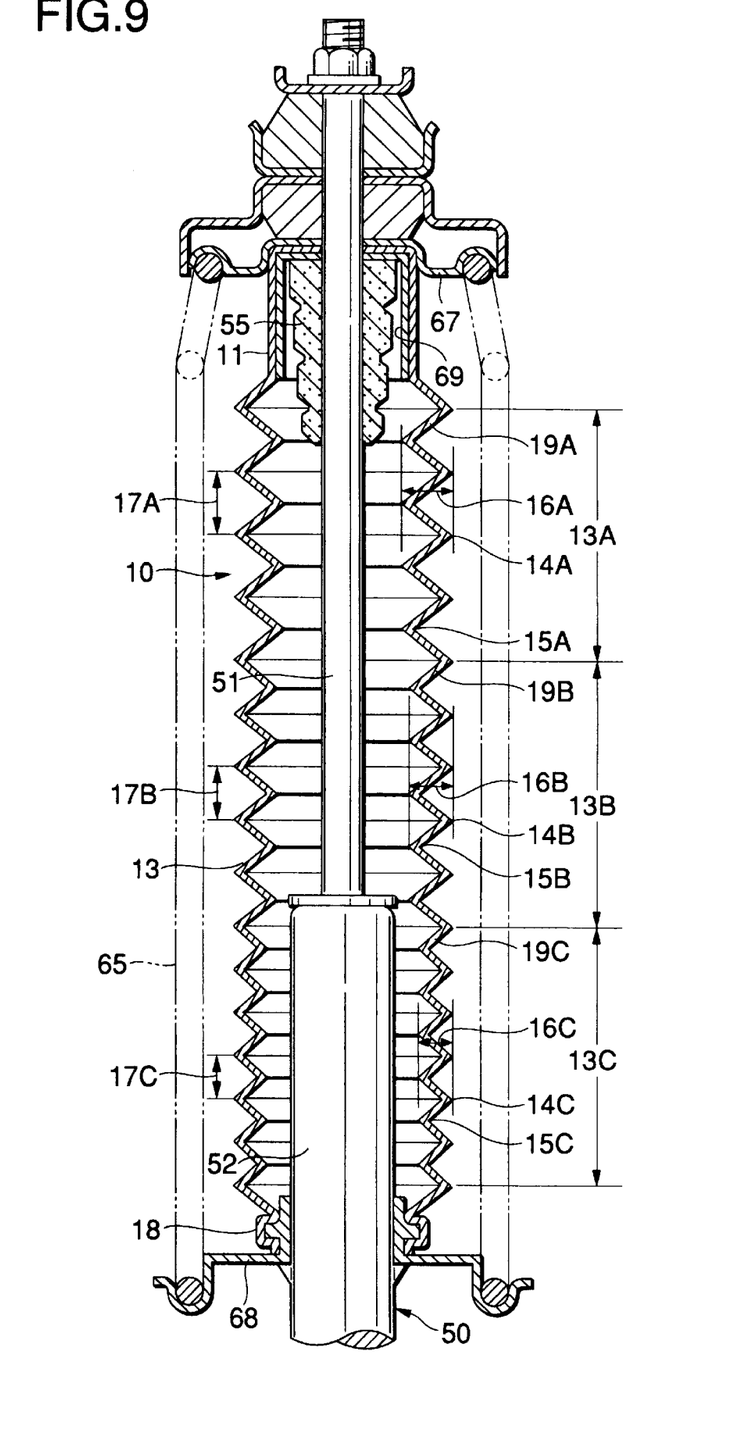
FIG. 9 is a sectional view showing the used state of a bellows cylinder equivalent to a fifth embodiment of the invention.
Figure 10A:
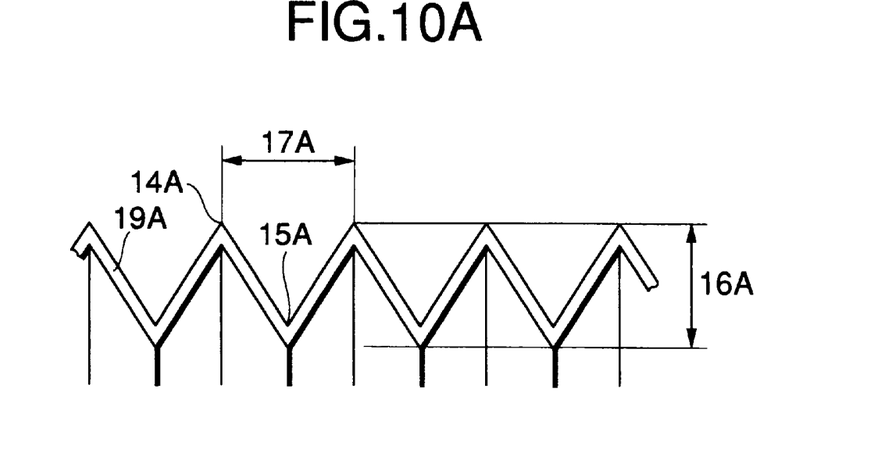
FIGS. 10A, 10B, 10C are sectional views showing the cylinder wall in each area in FIG. 9.
Figure 10B:
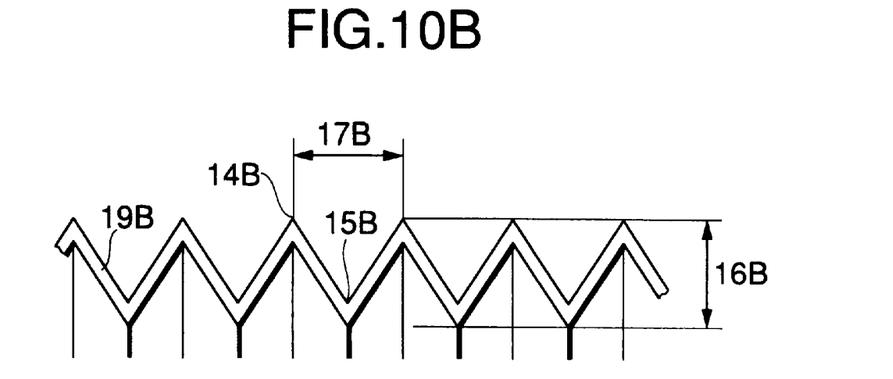
Figure 10C:
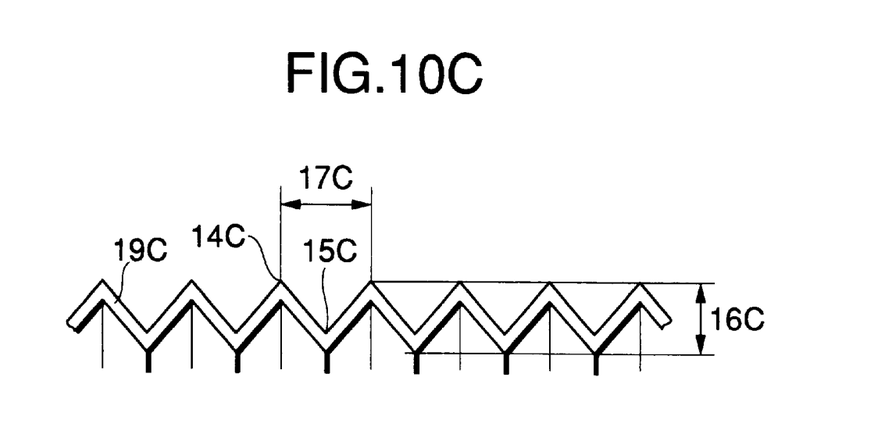
Figure 11:
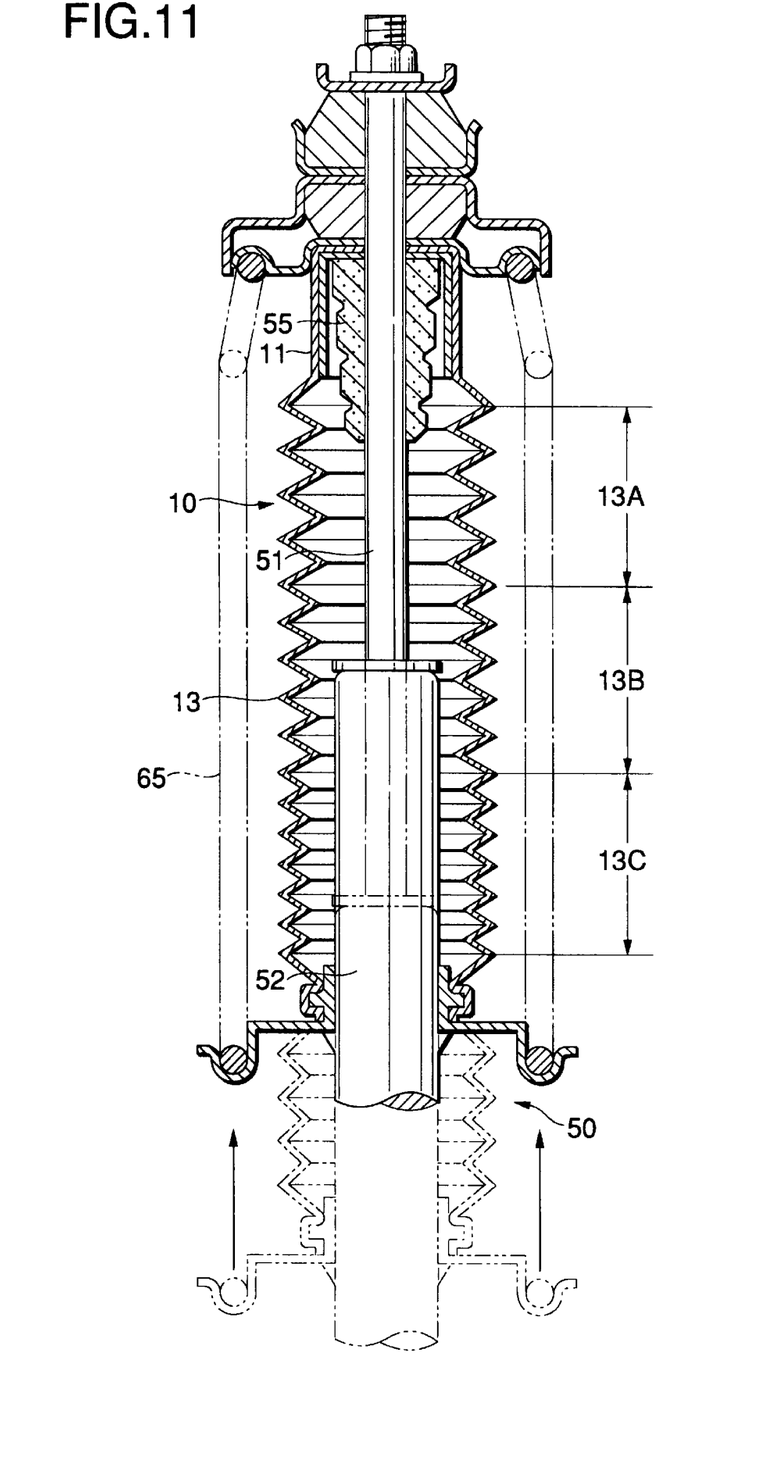
FIG. 11 is a sectional view showing the bellows cylinder when the bellows part is compressed in FIG. 9.

FIG. 9 is a sectional view showing the used state of a bellows cylinder equivalent to a fifth embodiment of the present invention, FIGS. 10A to 10C are sectional views showing the cylinder wall of each area and FIG. 11 is a sectional view showing the cylinder wall when the bellows part is compressed. However, in FIGS. 9 to 11, the same member as described in the item of the prior art is shown by the same reference number.

FIG. 9 shows a bellows cylinder according to a fifth embodiment of the present invention.

A bellows cylinder 10 shown in FIG. 9 is attached to cover the piston rod 51 of a shock absorber 50 in a vehicular suspension and formed by rubber, polyolefine thermoplastic elastomer (TPO), polyethylene, polyester elastomer or others. The bellows cylinder 10 in this embodiment is a cylinder the upper part of which is the housing cylinder 11 of a bump cushion 55 and the lower part of which is a bellows part 13. A groove 18 for fitting to a lower spring seat 68 is formed on the inner surface at the lower end.

The above bellows part 13 is provided to stretch or contract the bellows cylinder 10 according to the stretch or contraction of the piston rod 51 and a coil spring 65 and is formed with fixed thickness and in fixed outside diameter. The bellows part 13 is divided into three areas of the highest area 13A, a middle area 13B and the lowest area 13C at a predetermined interval along the longitudinal direction (a direction perpendicular to the diameter) and difference between the respective radiuses at ridges 14A, 14B, 14C and the respective radiuses at troughs 15A, 15B, 15C, that is, difference in a radius 16A, 16B, 16C and pitch (an interval between adjacent ridges or between adjacent troughs) 17A, 17B, 17C are differentiated every area. FIGS. 10A to 10C show the enlarged sections of the cylinder wall of the bellows part 13 in each area. FIG. 10A shows the cylinder wall in the highest area 13A, FIG. 10B shows the cylinder wall in the middle area 13B and FIG. 10C shows the cylinder wall in the lowest area 13C.

The difference 16A, 16B, 16C in a radius in each area is fixed in each area and is different in every area. In this embodiment, the difference in a radius is decreased in order from the highest area 13A to the lowest area 13C. That is, 16A >16B>16C in the difference in a radius. The difference in a radius has an effect upon easiness to compress the bellows part 13. That is, as the difference in a radius is increased, the width of each cylinder wall 19A, 19B, 19C between each ridge and each trough is increased, the rigidity of each cylinder wall 19A, 19B, 19C is decreased and the bellows part 13 is readily compressed. If it is considered whether the difference in a radius is large or small at the same pitch, the larger the difference in a radius is, the closer to a horizontal direction the tilt of each cylinder wall 19A, 19B, 19C between the ridge and the trough is and the bellows part 13 is readily compressed. Therefore, in this embodiment, if only the effect of the difference in a radius is considered, the bellows part is most readily compressed in the highest area 13A in which the difference in a radius is largest, it is next readily compressed in the middle area 13B and it is the most difficult to compress in the lowest area 13C.

Pitch in the bellows part 13 is decreased in the order of pitch 17A in the highest area 13A, pitch 17B in the middle area 13B and pitch 17C in the lowest area 13C as the above difference in a radius in this embodiment. It also has an effect upon the compression of the bellows part 13 whether pitch is large or small. That is, if pitch is considered with the same difference in a radius, the smaller the pitch is, the closer to a horizontal direction the tilt of each cylinder wall between each ridge and each trough is and the bellows part 13 is readily compressed. Therefore, in this embodiment, if only the effect of pitch is considered, the bellows part is most difficult to compress in the highest area 13A in which pitch is largest, it is next difficult to compress in the middle area 13B and it is most readily compressed in the lowest area 13C.

As described above, in the embodiment shown in FIG. 10, the highest area 13A and the lowest area 13C are contrary in the effect of the difference in a radius and the effect of pitch and thereby, the overall bellows part 13 can be uniformly compressed. Therefore, as shown in FIG. 11, when the piston rod 51 and the coil spring 65 are compressed by the irregularities of a road surface and others, the overall bellows part 13 of the bellows cylinder 10 is uniformly compressed and the so-called bend of the barrel hardly occurs because force is never applied to only a limited part.

The number of areas, the length of each area, the difference in a radius in every area and the value of pitch are different depending upon the material of the bellows cylinder 10, the length of the bellows part 13, whether a smooth cylindrical part and a smooth part for attachment exist at both ends of the bellows part 13 or not or others, are set so that the bellows part 13 is uniformly compressed. As a compressed state can be adjusted in every area by the variation of both the difference in a radius and pitch as described above, the bellows cylinder can be designed so that it is uniformly compressed even if the bellows part is difficult to compress uniformly by either of the difference in a radius or pitch.

In which position the bend of the barrel often occurs is naturally different depending upon the material of the bellows cylinder, the length of the bellows part and the form of both ends of the bellows part (whether a cylinder part without bellows exists or not, whether a part for attachment exists or not and others), the difference in a radius 14A, 14B and 14C and the pitch 17A, 17B, 17C which may not be necessarily arranged as shown in FIG. 9. As an example, a bellows cylinder consisting of TPO and formed by blow molding the overall length of which is set to 330 mm, the length of the highest area 13A in the bellows part 13 of which is set to 84 mm, the length of the middle area 13B in the bellows part 13 of which is set to 77 mm, the length of the lowest area 13C in the bellows part of which is set to 70 mm, the total radius to each ridge in the whole bellows part 13 of which is set to 71 mm, the thickness of the bellows part of which is set to 0.4 mm, the total radius to each trough in the highest area 13A of which is set to 53.6 mm, the difference 16A in a radius of which is set to 17.4 mm, the pitch 17A of which is set to 12 mm, the total radius to each trough in the middle area 13B of which is set to 55.6 mm, the difference 16B in a radius of which is set to 15.4 mm, the pitch 17B of which is set to 11 mm, the total radius to each trough in the lowest area 13C of which is set to 57.6 mm, the difference 16C in a radius of which is set to 13.4 mm and the pitch 17C of which is set to 10 mm is given.

When five bellows cylinders formed in the above dimension and five bellows cylinders with conventional type structure in which the difference in a radius and pitch are fixed in the overall bellows part are prepared to verify the effect of the present invention, each bellows part of the above bellows cylinders is attached to the periphery of the piston rod of each shock absorber and compressed and the maximum deformation quantity in the radial direction in the bellows part is measured. The maximum deformation quantity in the above bellows cylinders according to the present invention is 3.0 mm on the average, while the maximum deformation quantity in the conventional type bellows cylinders is 4.5 mm on the average and it can be verified that the bend of the barrel hardly occurs in the above bellows cylinders according to the present invention.

In the above embodiments, the bellows cylinder used for the dust cover of a vehicular suspension is described, however, the present invention can be also applied to bellows cylinders used for other machinery and others and design may be suitably modified such as the bellows part is provided to the whole bellow cylinder according to the machinery and others and a part to attach the bellows cylinder to the machinery is provided in a range in which the effect of the present invention is not prevented.

As shown in the drawings and described above, according to the bellows cylinder according to the present invention, the second surface is pressed inside the first surface when the bellows part is compressed, both is folded and the cylinder wall of the cylinder is seemingly thickened. Therefore, deflection in the radial direction Qf the bellows part hardly occurs and the bellows are extremely excellent in stability in compression. Therefore, even if the bellows part is extended, no bend of the barrel occurs on the way of compression, the bellows part is prevented from coming in contact with the coil spring, the cylinder and others and the bellows part can be securely prevented from being damaged.

Further, if the bellows part is divided into plural areas and the difference in a radius is differentiated in order in every area, the bellows part is compressed in order from an area in which the difference in a radius is large and the whole bellows part is compressed. If the bellows part is divided into plural areas and pitch is differentiated in every area, the bellows part is compressed in order from an area in which pitch is small to an area in which pitch is large. Therefore, as the present invention according to the first embodiment of the invention, as the bellows part is compressed in order from the end, even if the bellows part is long, the bend of the barrel caused because the bellows part is long when the bellows part is compressed can be reduced.

In addition, if the bellows part is divided into plural areas, the difference in a radius is increased or decreased in order in every area and pitch is conversely decreased or increased in order, the effect of preventing the above bend of the barrel can be further securely enhanced.

Further, as described above, in the bellows cylinder provided with the bellows part at least at a part according to the present invention, as the above bellows part is divided into plural areas along the longitudinal direction and the difference in a radius between each ridge and each trough and pitch are differentiated in every area, the overall bellows part can be uniformly compressed. By adjusting the compressed state in each area depending upon the difference in a radius and the pitch, the bend of the barrel caused by a fact that the bellows part is long when the bellows part is compressed can be reduced. There is also effect that as force is applied to the bellows part on the average, durability is enhanced.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A bellows cylinder, comprising:

a bellows part having a cylinder wall, said bellows part being moveable between an extended and compressed position;

said bellows part comprising a plurality of bellows continuously formed thereon, each of said plurality of bellows including a first surface and a second surface connected by a ridge, wherein a trough is formed between each adjacent bellow;

wherein said first surface is tilted to a radial direction of the bellows part;

wherein said second surface is substantially parallel to the radial direction of the bellows part; and wherein the second surface is operative to be pressed towards an inside of the first surface when said bellows part is in said compressed position such that said first and second surfaces are tilted with respect to the radial direction to form a deflection resisting wall.

2. A bellows cylinder according to claim 1, wherein said bellows part is divided into a plurality of areas along the longitudinal direction;

wherein a depth between said ridge and said trough is different in each of said areas; and wherein said depth increases from an area on one end of said bellows part to an area on an opposing end of said bellows part.

3. A bellows cylinder according to claim 1, wherein said bellows part is divided into a plurality of areas along the longitudinal direction;

wherein a pitch between adjacent ridges is different in every said area; and wherein said pitch increases from an area on one end of said bellows part to an area on an opposing end of said bellows part.

4. A bellows cylinder according to claim 1, wherein said bellows part is divided into a plurality of areas along the longitudinal direction;

wherein a depth between said ridge and said trough is different in every said area;

wherein a pitch between each adjacent ridge is different in every said area;

wherein said depth increases from an area on one end of said bellows part to an area on an opposing end of said bellows part; and wherein said pitch increases from one end of said bellows part to an area on an opposing end of said bellows part.

* * * * *